United States Patent
Park et al.

(10) Patent No.: US 10,780,741 B2
(45) Date of Patent: Sep. 22, 2020

(54) RUBBER COMPOSITION FOR TIRE TREADS AND TIRE MANUFACTURED BY USING THE SAME

(71) Applicant: HANKOOK TIRE CO., LTD., Seoul (KR)

(72) Inventors: Ji Hyun Park, Daejeon (KR); Sang Keol Lee, Daejeon (KR); Jung Hun Choi, Daejeon (KR); Sang Jin Lee, Daejeon (KR)

(73) Assignee: HANKOOK TIRE CO., LTD. (KR)

( * ) Notice: Subject to any disclaimer, the term of this patent is extended or adjusted under 35 U.S.C. 154(b) by 100 days.

(21) Appl. No.: 15/817,259

(22) Filed: Nov. 19, 2017

(65) Prior Publication Data

US 2018/0141378 A1    May 24, 2018

(30) Foreign Application Priority Data

Nov. 23, 2016    (KR) .................. 10-2016-0156636

(51) Int. Cl.
| | | |
|---|---|---|
| B60C 1/00 | (2006.01) | |
| C08K 5/09 | (2006.01) | |
| C08L 21/00 | (2006.01) | |
| C08K 3/36 | (2006.01) | |
| C08L 9/06 | (2006.01) | |

(52) U.S. Cl.
CPC .............. *B60C 1/0016* (2013.01); *C08K 3/36* (2013.01); *C08K 5/09* (2013.01); *C08L 9/06* (2013.01); *C08L 21/00* (2013.01); *C08K 2201/006* (2013.01); *C08L 2205/03* (2013.01)

(58) Field of Classification Search
CPC ................................ C08K 5/09; B60C 1/0016
See application file for complete search history.

(56) References Cited

U.S. PATENT DOCUMENTS

| | | | | |
|---|---|---|---|---|
| 4,983,329 | A * | 1/1991 | Cooper | C07C 41/03 426/611 |
| 5,252,649 | A | 10/1993 | Hausmann | |
| 5,733,970 | A * | 3/1998 | Craun | C08F 8/08 523/403 |
| 7,335,692 | B2 | 2/2008 | Vasseur et al. | |
| 7,411,018 | B2 * | 8/2008 | Appel | B60C 1/0016 524/318 |
| 7,432,318 | B2 * | 10/2008 | Kikuchi | B60C 1/0016 152/151 |
| 2014/0135437 | A1 | 5/2014 | Sandstrom et al. | |

FOREIGN PATENT DOCUMENTS

| | | |
|---|---|---|
| EP | 0561761 A1 | 9/1993 |
| EP | 1075967 A1 | 2/2001 |
| EP | 1329478 A1 | 7/2003 |
| EP | 1782966 A1 | 5/2007 |
| EP | 2284022 A1 | 2/2011 |
| EP | 2733170 A1 | 5/2014 |
| EP | 3109066 A1 | 12/2016 |
| JP | 2001253973 A | 9/2001 |
| JP | 2002348463 A | 12/2002 |
| JP | 2004519551 A | 7/2004 |
| JP | 2007510768 A | 4/2007 |
| JP | 2008056802 A | 3/2008 |
| JP | 2012149132 A | 8/2012 |
| JP | 2013231177 A | 11/2013 |
| JP | 2014065799 A | 4/2014 |
| JP | 2015507054 A | 3/2015 |
| JP | 2017110071 A | 6/2017 |
| KR | 100274905 B1 | 12/2000 |
| KR | 20090113037 A | 10/2009 |
| KR | 20120058297 A | 6/2012 |
| KR | 20120059118 A * | 6/2012 |
| KR | 20130034126 A | 4/2013 |
| KR | 20130074499 A | 7/2013 |
| KR | 101582209 B1 | 1/2016 |
| KR | 101615391 B1 | 4/2016 |
| KR | 20160040901 A | 4/2016 |
| WO | 2014179806 A1 | 11/2014 |
| WO | 2016195858 A1 | 12/2016 |

OTHER PUBLICATIONS

Machine translation of KR 20120059118 A, published Jun. 9, 2012. (Year: 2012).*
Kamal-Eldin et al., "A Multivariate Study of the Correlation between Tocopherol Contents and Fatty Acid Compositions in Vegetable Oils", JAOCS, vol. 74, No. 4 (1997).
Kamal-Eldin, Afaf et al., "A Multivariate Study of the Correlation Between Tocopherol Content and Fatty Acid Composition in Vegetable Oils", Journal of the American Oil Chemists' Society, pp. 375-380, vol. 74, No. 4 (1997).

* cited by examiner

*Primary Examiner* — Vickey Nerangis
(74) *Attorney, Agent, or Firm* — Renaissance IP Law Group LLP

(57) ABSTRACT

Disclosed are a rubber composition for tire treads which includes raw rubber including a natural rubber, a solution-polymerized styrene butadiene rubber and a neodymium butadiene rubber, a reinforcing filler including highly dispersible silica and carbon black and a natural oil having an unsaturated fatty acid content of 60 to 90% by weight, and a tire manufactured from the same. The tire manufactured from the rubber composition for tire treads according to the embodiment of the present invention can exhibit excellent braking performance, abrasion resistance and durability.

4 Claims, No Drawings

RUBBER COMPOSITION FOR TIRE TREADS AND TIRE MANUFACTURED BY USING THE SAME

CROSS-REFERENCE TO RELATED APPLICATION

This patent application claims the benefit of priority under 35 U.S.C. 119 of Korean Patent Application No. 10-2016-0156636, filed on Nov. 23, 2016, the contents of which are hereby incorporated by reference for all purposes as if fully set forth herein.

BACKGROUND OF THE INVENTION

Field of the Invention

The present invention relates to a rubber composition for tire treads which includes raw rubber including a natural rubber, a solution-polymerized styrene butadiene rubber and a neodymium butadiene rubber, a reinforcing filler including highly dispersible silica and carbon black, and a modified oil having an oleic acid content of 70 mol % or more, and a tire manufactured from the rubber composition.

Description of the Related Art

In recent years, as customers' interest and specialist knowledge in vehicles and tires are increasing and commercial products are varied, performance required in the field of vehicles is also increasing. The main market of the vehicle industry is broadly divided into Europe and North America. The European market requires performance focusing on handling and braking performance, while the North American market focuses more on stability and durability.

Since the European market introduced a labeling policy associated with tire performance in 2012, they have provided customers with information through marking grades with regard to braking performance on wet roads, fuel efficiency and noise. In response to this, recently, new products have been developed based on labeling performance in the tire industry as well. For this reason, there is a remarkable trade-off between different types of tire performances, that is, a phenomenon in which, if one performance is improved, another performance becomes adverse.

Representative trade-off performances include abrasion resistance which is a factor important for customers' satisfaction in terms of tire purchase costs, snow performance determining braking on ice and snowy roads and handling performance in winter, and fatigue resistance determining long-term safety of tire driving.

The tire industry is being developed towards all-season tires from the environment of the conventional European market divided into tires for summer and tires for winter, along with the development of the South America market. Representative trade-off performances of all-season tires are braking performance on wet roads, and abrasion resistance and braking performance on ice and snowy roads, which are incompatible with one another. Braking performance on wet roads can be improved by increasing the content of rubber containing a great amount of styrene, or the content of silica used as a reinforcing agent. This improves hardness and modulus of rubber, so braking performance on ice and snowy roads at low hardness is deteriorated.

In addition, with respect to the glass transition temperature (Tg) of the rubber, braking performance on wet roads is advantageous at a high glass transition temperature, but abrasion resistance and braking performance on ice and snowy roads are advantageous at a low glass transition temperature.

The range of temperature, at which the tire is generally used, is wide, which ranges from −20 to 40° C. However, a synthetic oil used to facilitate rubber processing may be eluted in a tread during long-term driving on high-temperature asphalt which is heated up to 40° C. in the middle of summer, thus finally causing variation in the elastic properties of rubber and harming tire driving stability. In particular, a tire having a filler content of 100 phr or more inevitably contains a great amount of synthetic oil in order to secure stability of rubber, which negatively affects long-term durability and aging properties of tires.

PRIOR ART

Patent Document

Japanese Patent Laid-open No. 2001-253973
Korean Patent No. 0964308
Korean Patent No. 1278216
Korean Patent Laid-open No. 2010-0120014

SUMMARY OF THE INVENTION

Therefore, the present invention has been made in view of the above problems, and it is an object of the present invention to provide a rubber composition for tire treads which can maintain braking performance on wet roads and exhibits excellent abrasion resistance, braking performance on ice and snowy roads, and tread durability at a high temperature.

It is another object of the present invention to provide a tire manufactured using the rubber composition for tire treads.

In accordance with the present invention, the above and other objects can be accomplished by the provision of a rubber composition for tire treads including 100 parts by weight of a raw rubber, 70 to 120 parts by weight of a reinforcing filler, and 10 to 60 parts by weight of a natural oil having a ratio of linolenic acid:oleic acid of 1:0.5 to 1:5.

The raw rubber may include 5 to 10 parts by weight of a natural rubber, 40 to 70 parts by weight of a solution-polymerized styrene butadiene rubber, and 20 to 50 parts by weight of a neodymium butadiene rubber.

The solution-polymerized styrene butadiene rubber may have a styrene content of 20 to 50% by weight, a vinyl content of 10 to 40% by weight, a Tg of −50 to −20° C., and include 20 to 40 parts by weight of an SRAE oil.

The neodymium butadiene rubber may have a cis-1,4-butadiene content of 95% by weight or more and a Tg of −100 to −120° C.

The reinforcing filler may include 65 to 100 parts by weight of a highly dispersible silica, and 5 to 20 parts by weight of carbon black.

The highly dispersible silica may have a nitrogen adsorption value of 160 to 180 m$^2$/g, a CTAB adsorption value of 150 to 170 m$^2$/g, and a DBP absorption amount of 180 to 200 cc/100 g.

The natural oil may include an oil substance obtained by extracting and separating linolenic acid and oleic acid from any one natural oil selected from the group consisting of soybean oil, sunflower seed oil, cottonseed oil, corn oil, canola oil, palm oil, grape seed oil and a mixture thereof, and then mixing the same.

The natural oil may include 60 to 90% by weight of unsaturated fatty acid including the linolenic acid and the oleic acid.

The rubber composition for tire treads may further include 5 to 20 parts by weight of a silane coupling agent selected from the group consisting of bis-(trialkoxysilylpropyl)polysulfide (TESPD), bis-3-triethoxysilylpropyltetrasulfide (TESPT) and a mixture thereof, with respect to 100 parts by weight of the raw rubber.

In another aspect of the present invention, provided is a tire manufactured using the rubber composition for tire treads.

DETAILED DESCRIPTION OF THE INVENTION

Hereinafter, embodiments of the present invention will be described in detail. These embodiments are provided to more specifically describe the technical concept of the present invention and the inventions defined in claims of the present invention are not limited by the embodiments and are defined only by the scope of the claims of the present invention.

In order to provide a rubber composition for tire treads which can maintain braking performance on wet roads and exhibit excellent abrasion resistance, braking performance on ice and snow, and tread durability against aging at high temperatures, the present invention provides a rubber composition for tire treads which includes: 100 parts by weight of a raw rubber including a natural rubber, a solution-polymerized styrene butadiene rubber and a neodymium butadiene rubber; 70 to 120 parts by weight of a reinforcing filler including highly dispersible silica and carbon black; and 10 to 60 parts by weight of a natural oil wherein linolenic acid and oleic acid are present in a rate of 1:0.5 to 1:5 and the unsaturated fatty acids are present in an amount of 60 to 90% by weight.

Hereinafter, the respective ingredients will be described in detail.

1) Raw Rubber

The raw rubber may include 5 to 10 parts by weight of the natural rubber, 40 to 70 parts by weight of the solution-polymerized styrene butadiene rubber, and 20 to 50 parts by weight of the neodymium butadiene rubber.

The natural rubber refers to all naturally obtained rubbers and may be any naturally derived rubber and its origin and so on is not limited. The chemical name of the natural rubber may be polyisoprene and the natural rubber more preferably includes cis-1,4-polyisoprene as a main ingredient.

The natural rubber may be present in an amount of 5 to 10 parts by weight, with respect to 100 parts by weight of the raw rubber. When the natural rubber is present in an amount of less than 5 parts by weight, inherent properties of natural rubber having a crystallization structure are insufficient and when the natural rubber is present in an amount exceeding 10 parts by weight, the problem of poor miscibility with the synthetic rubber may occur.

The solution-polymerized styrene butadiene rubber (simply referred to as "SBR") has a styrene content of 20 to 50% by weight, a vinyl content of 10 to 40% by weight and a glass transition temperature (Tg) of −50 to −20° C. When the styrene and vinyl contents, and the glass transition temperature do not fall into the ranges defined above, braking performance on wet roads may be adversely affected.

The solution-polymerized styrene butadiene rubber increases the glass transition temperature, thereby improving grip performance.

The solution-polymerized styrene butadiene rubber may include 20 to 40 parts by weight of an aromatic oil with respect to 100 parts by weight of a raw rubbery elastomer. Preferably, the aromatic oil may include 20 to 40 parts by weight of safety residual aromatic extract (SRAE) oil and the SRAE oil can improve flexibility of styrene butadiene rubber (SBR) which is deteriorated by styrene. In addition, more preferably, when considering the effect of significantly improving flexibility of SBR, the SRAE oil is preferably present in an amount of 35 to 40 parts by weight. When the SRAE oil is present in an amount of less than 20 parts by weight or more than 40 parts by weight, the effect of improving braking performance on ice or snowy roads, or wet roads may be poor.

In this case, the SRAE oil is obtained by re-extracting the residue left behind after extracting treated distillate aromatic extract (TDAE) oil and a total content of polycyclic aromatic hydrocarbon (PAH) including benzo(a)pyrene, benzo(e)pyrene, benzo(a)anthracene, benzoanthracene, chrysene, benzo(b)fluoranthene, benzo(j)fluoranthene, benzo(k)fluoranthene, and dibenzo(a,h)anthracene is 3% by weight or less which is equal to that of the TDAE oil, but its kinematic viscosity is 95 SUS (Saybolt universal second at 210° F.) which is distinguished from the TDAE oil. In addition, a softening agent of the SRAE oil may include an aromatic ingredient of 15 to 25% by weight, a naphthene ingredient of 35 to 55% by weight and a paraffin ingredient of 25 to 45% by weight.

In addition, the solution-polymerized styrene butadiene rubber may be present in an amount of 40 to 70 parts by weight with respect to 100 parts by weight of the total weight of the raw rubber.

The solution-polymerized styrene butadiene rubber may have excellent processability due to wide molecular weight distribution and may be advantageous in terms of abrasion resistance due to high molecular weight. More preferably, the solution-polymerized styrene butadiene rubber may have a weight average molecular weight (Mw) of 1,200,000 to 1,700,000 g/mol, molecular weight distribution of 1.5 or more, more preferably of 1.5 to 3.0, even more preferably, of 1.5 to 2.5. The used raw rubber has low styrene and vinyl contents and thus low glass transition temperature, thus being advantageous in terms of braking performance on ice and snowy roads.

The neodymium butadiene rubber refers to a butadiene rubber polymerized using a neodymium catalyst and an effective neodymium catalyst may be a compound which contains a ligand around a neodymium metal such as neodymium carboxylate ($Nd(OOCR)_3$ in which R broadly refers to an alkyl group).

The neodymium butadiene rubber may be a high-cis neodymium butadiene rubber which contains 95% by weight or more of cis-1,4-butadiene in the molecule. As such, by using the butadiene rubber having a high cis-bond content, abrasion resistance and braking performance of the tire rubber composition can be improved.

In addition, the neodymium butadiene rubber may have a glass transition temperature (Tg) of −100 to −120° C. and a molecular weight distribution of 1.5 to 2.5, and contain no oil.

The neodymium butadiene rubber has lower hysteresis heat loss and is thus advantageous in terms of rotational resistance, because it has a narrow molecular weight distribution and a linear molecular structure, compared to cobalt butadiene or nickel butadiene rubber. In addition, the neodymium butadiene rubber is also advantageous in terms of braking performance on ice and snowy roads because it has the lowest glass transition temperature among raw rubber compositions.

The neodymium butadiene rubber may be present in an amount of 20 to 50 parts by weight, with respect to 100 parts by weight of the raw rubber in total. When the neodymium butadiene rubber is present in an amount of less than 20 parts by weight, there are drawbacks of low abrasion resistance and fuel efficiency, and when the neodymium butadiene rubber exceeds 50 parts by weight, processbility may be deteriorated.

Furthermore, in addition to the natural rubber, the solution-polymerized styrene butadiene rubber and the neodymium butadiene rubber, the raw rubber of the present invention may further include any one selected from the group consisting of a polybutadiene rubber, a conjugated diene aromatic vinyl copolymer, a hydrogenated natural rubber, an olefin rubber, an ethylene-propylene rubber modified with maleic acid, a butyl rubber, a copolymer of isobutylene and an aromatic vinyl or diene monomer, an acrylic rubber, an ionomer-containing rubber, a halogenated rubber, a chloroprene rubber and a mixture thereof.

2) Reinforcing Filler

Meanwhile, the rubber composition for tire treads, as a reinforcing filler, may include highly dispersible silica and carbon black.

The rubber composition for tire treads according to an embodiment of the present invention has high dispersibility because it contains high-dispersibility silica of particles smaller than those of general silica (intermediate-dispersibilily silica), thus improving abrasion resistance as well as braking performance and low rotational resistance.

The highly dispersible silica has a nitrogen adsorption value of 160 to 180 $m^2/g$, a CTAB adsorption value of 150 to 170 $m^2/g$, and a DBP absorption amount of 180 to 200 cc/100 g, and the highly dispersible silica may be present in an amount of 65 to 100 parts by weight, with respect to 100 parts by weight of the raw rubber. When the silica is present in an amount of less than 65 parts by weight, there is a problem of low braking performance, and when the silica is present in an amount exceeding 100 parts by weight, there are problems of poor abrasion resistance and fuel efficiency.

The carbon black may have a nitrogen surface area per gram ($N_2SA$) of 30 to 300 $m^2/g$, and a DBP(n-dibutyl phthalate) absorption amount of 60 to 180 cc/100 g, but the present invention is not limited thereto.

When the nitrogen surface area per gram of carbon black exceeds 300 $m^2/g$, the rubber composition for tires may have low processability, and when the nitrogen surface area per gram is less than 30 $m^2/g$, reinforcing performance by carbon black as a filler may be deteriorated. In addition, when the DBP absorption amount of carbon black exceeds 180 cc/100 g, processability of the rubber composition may be deteriorated, and when the DBP absorption amount is less than 60 cc/100 g, reinforcing performance of carbon black as the filler may be deteriorated.

Representative examples of the carbon black include N110, N121, N134, N220, N231, N234, N242, N293, N299, S315, N326, N330, N332, N339, N343, N347, N351, N358, N375, N539, N550, N582, N630, N642, N650, N683, N754, N762, N765, N774, N787, N907, N908, N990, N991 and the like.

The rubber composition for tire treads according to the embodiment of the present invention may include 5 to 20 parts by weight of the carbon black, with respect to 100 parts by weight of the raw rubber. When the carbon black is present in an amount of less than 5 parts by weight, reinforcement effect is insufficient and when the carbon black is present in an amount exceeding 20 parts by weight, braking performance on ice and snowy roads may be deteriorated due to deteriorated rotational resistance and excessively increased reinforcement.

In general, in a rubber composition, silica is chemically bonded to the rubber while being modified to be lipophilic in the rubber through reaction with a silane coupling agent. As such, when the surface chemical characteristics of silica are changed, movement of silica in the rubber is limited and hysteresis is thus decreased. As a result, heating and rotation resistance of the rubber composition are decreased. However, when distribution of silica in the rubber is not sufficient, decreases in heating and rotation resistance are insufficient and abrasion resistance is deteriorated. The rubber composition for tire treads according to the embodiment of the present invention may further include a silane coupling agent.

Any silane coupling agent may be used without particular limitation so long as it is commonly used as a coupling agent to silica in the rubber composition. Specifically, the silane coupling agent may be selected from the group consisting of a sulfide-based silane compound, a mercapto-based silane compound, a vinyl-based silane compound, an amino-based silane compound, a glycidoxy-based silane compound, a nitro-based silane compound, a chloro-based silane compound, a methacryl-based silane compound and a mixture thereof.

The sulfide-based silane compound may be any one selected from the group consisting of bis(3-triethoxysilylpropyl)tetrasulfide, bis(2-triethoxysilylethyl)tetrasulfide, bis(4-triethoxysilylbutyl) tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxy silylethyl-N,N-dimethylthiocarbamoyl tetrasulfide, 3-trimethoxysilylpropyl benzothiazolyl tetrasulfide, 3-triethoxysilylpropyl benzothiazol tetrasulfide, 3-trimethoxysilylpropyl methacrylate monosulfide, 3-triethoxysilylpropyl methacrylate monosulfide and a mixture thereof.

The mercapto silane compound may be any one selected from the group consisting of 3-mercaptopropyltrimethoxysilane, 3-mercaptopropyltriethoxysilane, 2-mercaptoethyltrimethoxysilane, 2-mercaptoethyltriethoxysilane and a combination thereof. The vinyl-based silane compound may be any one selected from the group consisting of ethoxysilane, vinyltrimethoxysilane and a combination thereof.

The amino-based silane compound may be any one selected from the group consisting of 3-aminopropyltriethoxysilane, 3-aminopropyltrimethoxysilane, 3-(2-aminoethyl)aminopropyltriethoxysilane, 3-(2-aminoethyl)aminopropyltrimethoxysilane and a combination thereof.

The glycidoxy-based silane compound may be any one selected from the group consisting of γ-glycidoxypropyltriethoxysilane, γ-glycidoxypropyltrimethoxysilane, γ-glycidoxypropylmethyldiethoxysilane, γ-glycidoxypropylmethyldimethoxysilane and a combination thereof. The nitro-based silane compound may be any one selected from the group consisting of 3-nitropropyltrimethoxysilane, 3-nitropropyltriethoxysilane and a combination thereof. The chloro-based silane compound may be any one selected from the group consisting of 3-chloropropyltrimethoxysilane, 3-chloropropyltriethoxysilane, 2-chloroethyltrimethoxysilane, 2-chloroethyl triethoxysilane and a combination thereof.

The methacryl-based silane compound may be any one selected from the group consisting of γ-methacryloxypropyl trimethoxysilane, γ-methacryloxypropyl methyldimethoxysilane, γ-methacryloxypropyl dimethylmethoxysilane and a combination thereof.

Among the silane coupling agents described above, the sulfide-based silane compound is preferred in consideration of coupling effects to silica. Preferably, the sulfide-based silane compound may be any one selected from the group consisting of bis-(trialkoxysilylpropyl)polysulfide (TESPD), bis-3-triethoxysilylpropyltetrasulfide (TESPT) and a mixture thereof.

The silane coupling agent may be present in an amount of 5 to 20 parts by weight, with respect to 100 parts by weight of the raw rubber. When the content of the silane coupling agent is lower than 5 parts by weight, the effect of converting the surface chemical characteristics of silica is insufficient and dispersibility of silica is thus deteriorated. As a result, reinforcement and durability of tires may be deteriorated. In addition, when the content of the silane coupling agent exceeds 20 parts by weight, abrasion resistance and fuel efficiency of tires may be deteriorated due to use of excess silane coupling agent. When taking significant improvement into account, the silane coupling agent is more preferably present in an amount of 5 to 7 parts by weight with respect to 100 parts by weight of the raw rubber.

In a more preferable embodiment of the present invention, carbon black may be used alone or a silane coupling agent may be further added alone. More preferably, use of 5 to 20 parts by weight of a mixture consisting of 50% by weight of TESPD or TESPT and 50% by weight of carbon black, with respect to 100 parts by weight of the raw rubber, is more efficient in improving the reinforcement of the filler and the effect of highly dispersible silica.

In addition, the rubber composition for tire treads according to the embodiment of the present invention may further include a processing aid to improve dispersibility of silica. In general, a silane coupling agent serves as a bridge which connects a silanol group of the surface of silica to a raw rubber of the composition and functions to eliminate strong silica-silica agglomeration when silica is used alone. However, when the content or specific surface area of silica in the rubber is increased, dispersibility is often deteriorated in spite of adding the silane coupling agent.

In this regard, in an embodiment of the present invention, the rubber composition for tire treads includes, as a processing aid, a metal salt modified with an aliphatic compound, specifically a fatty acid ester-based compound, more specifically, a C13 to C22 fatty acid ester-based compound, thereby improving dispersibility of silica present in a high amount, and enhancing scorch stability, durability and abrasion resistance.

The processing aid is an amphiphilic material which includes both a hydrophilic group of a metal ion and a hydrophobic group of a fatty acid, and the metal ion reacts with a silanol group of the surface of silica to reduce intermolecular surface energy of silica agglomerate particles that are strongly bound to each other via hydrogen bonding or dipole bonding and thereby induce de-agglomeration during mixing. As a result, the viscosity of the rubber composition for tire treads is reduced, so that flow property is increased and scorch stability, durability and abrasion resistance are improved. In addition, hydrocarbon of the fatty acid serves as a plasticizer to improve processability by diluting rubber chains due to excellent compatibility with the rubber chains.

Specifically, regarding the processing aid, the metal salt may be a zinc soap, a sodium soap, a potassium soap, or a zinc potassium soap or the like. However, since the sodium and potassium soaps react with silica due to strong polarity before silica reacts with a coupling agent, there is a risk that scorch stability and vulcanization time are shortened. Therefore, the metal salt is more preferably a zinc soap.

In addition, preferably, the zinc soap may include 1 to 5% by weight of zinc with respect to the total weight of the zinc soap. When the content of zinc in the zinc soap is less than 1% by weight, the dispersion effect is insufficient and when the zinc content exceeds 5% by weight, performance of the rubber composition may be deteriorated due to increased production of zinc salts.

In addition, the fatty acid ester is specifically an ester of a C12 to C22 saturated or unsaturated fatty acid, more specifically, an aliphatic or aromatic carboxylic acid.

Modification of fatty acid ester with respect to the zinc soap may be carried out by mixing the fatty acid ester and zinc soap in a weight ratio of 20:80 to 40:60 and conducting condensation. In this case, when the mix weight ratio of zinc soap and fatty acid ester in the processing aid is not within the range of 20:80 to 40:60, the effect of improving dispersibility may be deteriorated.

In addition, the aforementioned processing aid may be present in an amount of 0.5 to 5 parts by weight with respect to 100 parts by weight of the raw rubber. When the content of processing aid is less than 0.5 parts by weight, the effect of dispersing silica is insufficient and when the content of the processing aid exceeds 5 parts by weight, the improvement effect compared to the amount of used processing aid is slight. In addition, when taking significance of improved effect into account, the processing aid is more preferably present in an amount of 1 to 3 parts by weight with respect to 100 parts by weight of the raw rubber.

3) Natural Oil

The natural oil may include any one selected from the group consisting of soybean oil, sunflower seed oil, cottonseed oil, corn oil, canola oil, palm oil, grape seed oil and a mixture thereof, and more preferably may include an oil obtained by extracting and separating unsaturated fatty acid from the natural oil and controlling the content thereof. In addition, more preferred is an oil obtained by extracting and separating oleic acid and linolenic acid from the natural oil, then mixing the acids and controlling a suitable ratio of oleic acid to linolenic acid. The method of extracting, separating and mixing unsaturated fatty acids, in particular, linolenic acid and oleic acid may be carried out by any method commonly used for extracting and separating unsaturated fatty acids, preferably by extraction using an organic solvent, supercritical fluid or the like, or fractional crystallization or fractional distillation.

The natural oil used in the embodiment of the present invention is an oil containing unsaturated fatty acid in an amount of 60 to 90% by weight, more preferably 70 to 90% by weight. When the content of the unsaturated fatty acid in the natural oil is less than 60% by weight or higher than 90% by weight, the effect of improving tire performance may not be obtained to a desired extent.

In an attempt to improve abrasion resistance, braking on ice and snowy roads and durability of tires, the present invention utilizes unsaturated fatty acid wherein a ratio (OA/LA) of oleic acid (OA) to linolenic acid (LA) is 0.5 to 5, in other words, linolenic acid:oleic acid is 1:0.5 to 1:5. More preferably, the ratio of the linolenic acid:oleic acid is 1:1 to 1:4, more preferably, 1:2 to 1:3. When the ratio is less than 0.5, braking performance on ice and snowy roads, and abrasion resistance are excellent, but trade-off of braking performance on wet roads and rotation resistance is high, and when the ratio is 5 or more, trade-off of braking performance on wet roads and rotation resistance is low, but the effects of braking performance on ice and snowy roads and abrasion resistance may also be insufficient.

More preferably, the natural oil may be used in an amount of 10 to 60 parts by weight, with respect to 100 parts by weight of the raw rubber. When the content of natural oil is less than 10 parts by weight, the effects of improving abrasion resistance and braking performance on ice and snowy roads may be disadvantageously slight and when the ratio exceeds 60 parts by weight, disadvantageously, rotation resistance and braking performance on wet roads may be disadvantageously excessively deteriorated.

4) Other Additives

Also, in addition to the ingredients, the rubber composition for tire treads according to the present invention may further include, optionally, a single additive such as a vulcanization agent, a vulcanization accelerator, a vulcanization accelerator aid, an anti-aging agent, a softening agent, an adhesive agent, or a mixture thereof.

The vulcanization agent may be any one that can be included in a rubber composition for tires, but may be a sulfur-based vulcanization agent, an organic peroxide, a resin vulcanization agent, or metal oxide such as magnesium oxide.

The sulfur-based vulcanization agent may be an inorganic vulcanizing agent such as powdered sulfur, insoluble sulfur, precipitated sulfur, or colloidal sulfur, or an organic vulcanizing agent such as tetramethylthiuram disulfide (TMTD), tetraethylthiuram disulfide (TETD), and dithiodimorpholine. Also, elemental sulfur or a vulcanization agent for producing elemental sulfur, for example, amine disulfide, or polymeric sulfur may be used.

The organic peroxide may be benzoyl peroxide, dicumyl peroxide, di-t-butyl peroxide, t-butylcumyl peroxide, methyl ethyl ketone peroxide, cumene hydroperoxide, 2,5-dimethyl-2,5-di(t-butylperoxy)hexane, 2,5-dimethyl-2,5-di(benzoylperoxy)hexane, 1,3-bis(t-butylperoxypropyl)benzene, di-t-butylperoxy-diisopropylbenzene, t-butylperoxybenzene, 2,4-dichlorobenzoyl peroxide, 1,1-dibutylperoxy-3,3,5-trimethylsiloxane, n-butyl-4,4-di-t-butylperoxyvalerate or the like.

More preferably, the vulcanization agent may be a sulfur vulcanization agent. For example, the sulfur vulcanization agent may be selected from elemental sulfur and a vulcanization agent for producing sulfur. The vulcanization agent for producing sulfur may be any one selected from amine disulfide, polymeric sulfur and a mixture thereof. More preferably, in an embodiment of the present invention, the vulcanization agent may be elemental sulfur. The vulcanization agent is present in an amount of 0.5 to 2.0 parts by weight, with respect to 100 parts by weight of the raw rubber in that it exerts suitable vulcanization effects of making raw rubber less vulnerable to heat and chemically stable.

The vulcanization accelerator means an accelerator which facilitates the vulcanization rate or promotes delay in the initial vulcanization state. The vulcanization accelerator may be any one selected from sulfenamide-based, thiazole-based, thiuram-based, thiourea-based, guanidine-based, dithiocarbamic acid-based, aldehyde-amine-based, aldehyde-ammonia-based, imidazoline-based and xanthate-based vulcanization accelerators and combinations thereof.

The sulfenamide vulcanization accelerator may be, for example, a sulfenamide compound selected from the group consisting of N-cyclohexyl-2-benzothiazylsulfenamide (CBS), N-tert-butyl-2-benzothiazylsulfenamide (TBBS), N,N-dicyclohexyl-2-benzothiazylsulfenamide, N-oxydiethylene-2-benzothiazylsulfenamide, N,N-diisopropyl-2-benzothiazolsulfenamide and a combination thereof.

The thiazole-based vulcanization accelerator may be, for example, any one thiazole-based compound selected from the group consisting of sodium salts of 2-mercaptobenzothiazole (MBT), dibenzothiazyl disulfide (MBTS) and 2-mercaptobenzothiazole, amine salts of 2-mercaptobenzothiazole, copper salts of 2-mercaptobenzothiazole, cyclohexylamine salts of 2-mercaptobenzothiazole, 2-(2,4-dinitrophenyl)mercaptobenzothiazole, 2-(2,6-diethyl-4-morpholinothio)benzothiazole and combinations thereof.

The thiuram-based vulcanization accelerator may be, for example, a thiuram-based compound selected from the group consisting of tetramethylthiuram disulfide (TMTD), tetraethylthiuram disulfide, tetramethylthiuram monosulfide, dipentamethylene thiuram disulfide, dipentamethylene thiuram monosulfide, dipentamethylene thiuram tetrasulfide, dipentamethylene thiuram hexasulfide, tetrabutylthiuram disulfide, pentamethylene thiuram tetrasulfide and a combination thereof.

The thiourea-based vulcanization accelerator is, for example, any one thiourea-based compound selected from the group consisting of thiocarbamide, diethylthiourea, dibutylthiourea, trimethylthiourea, diortho-tolylthiourea and a combination thereof.

The guanidine-based vulcanization accelerator is, for example, any one guanidine-based compound selected from the group consisting of diphenylguanidine, diortho-tolylguanidine, triphenylguanidine, ortho-tolylbiguanidine, diphenylguanidine phthalate and a combination thereof.

The dithiocarbamic acid-based vulcanization accelerator is, for example, any one dithiocarbamic acid-based compound selected from the group consisting of zinc ethylphenyl dithiocarbamate, zinc butylphenyl dithiocarbamate, sodium dimethyl dithiocarbamate, zinc dimethyl dithiocarbamate, zinc diethyl dithiocarbamate, zinc dibutyl dithiocarbamate, zinc diamyldithiocarbamate, zinc dipropyl dithiocarbamate, complex salts of zinc pentamethylene dithiocarbamate and piperidine, zinc hexadecyl isopropyl dithiocarbamate, zinc octadecyl isopropyl dithiocarbamate, zinc dibenzyl dithiocarbamate, sodium diethyl dithiocarbamate, piperidine pentamethylene dithiocarbamate, selenium dimethyl dithiocarbamate, tellurium diethyl dithiocarbamate, cadmium diamyl dithiocarbamate and a combination thereof.

The aldehyde-amine-based or aldehyde-ammonia-based vulcanization accelerator is, for example, an aldehyde-amine-based or aldehyde-ammonia-based compound selected from the group consisting of an acetaldehyde-aniline reaction product, a butyraldehyde-aniline condensate, hexamethylenetetramine, an acetaldehyde-ammonia reaction product and a combination thereof.

The imidazoline-based vulcanization accelerator is, for example, an imidazoline-based compound such as 2-mercaptoimidazoline, and the xanthate-based vulcanization accelerator is, for example, a xanthate-based compound such as zinc dibutyl xanthate.

More preferably, the vulcanization accelerator includes 1.0 to 2.5 parts by weight of any one selected from the group consisting of amine, disulfide, guanidine, thiourea, thiazole, thiuram, sulfene amide and a mixture thereof, with respect to 100 parts by weight of the raw rubber, in order to improve productivity and maximize physical properties of rubber through increase in vulcanization rate.

The vulcanization accelerator aid is used in combination with the vulcanization accelerator in order to complete facilitation effects of the vulcanization accelerator, which may be any one selected from the group consisting of an inorganic vulcanization accelerator, an organic vulcanization accelerator and a combination thereof.

The inorganic vulcanization accelerator aid may be any one selected from the group consisting of zinc oxide (ZnO), zinc carbonate, magnesium oxide (MgO), lead oxide, potassium hydroxide and a combination thereof. The organic vulcanization accelerator aid may be any one selected from the group consisting of stearic acid, zinc stearate, palmitic acid, linoleic acid, oleic acid, lauric acid, dibutyl ammonium oleate, derivatives thereof and a combination thereof.

In particular, the vulcanization accelerator aid may be a combination of zinc oxide and stearic acid. In this case, zinc oxide is dissolved in stearic acid to produce an effective complex with the vulcanization accelerator, which creates advantageous sulfur during vulcanization and thereby facilitates crosslinkage of rubber. In a case in which zinc oxide and stearic acid are used in combination, in order to serve as a suitable vulcanization accelerator aid, each thereof may be used in an amount of 1 to 10 parts by weight, with respect to 100 parts by weight of the raw rubber.

The anti-aging agent is an additive used to stop chain reactions in which tires are automatically oxidized by oxygen. In addition to anti-aging, the anti-aging agent should have high solubility to rubber, low volatility and inactivity to rubber, and should not suppress vulcanization. The anti-aging agent may be any one suitably selected from amine, phenol, quinoline, imidazole, carbamic acid metal salts, wax and a combination thereof.

The amine-based anti-aging agent may be selected from the group consisting of N-phenyl-N'-(1,3-dimethyl)-p-phenylenediamine, N-(1,3-dimethylbutyl)-N'-phenyl-p-phenylenediamine, N-phenyl-N'-isopropyl-p-phenylenediamine, N,N'-diphenyl-p-phenylenediamine, N,N'-diaryl-p-phenylenediamine, N-phenyl-N'-cyclohexyl p-phenylenediamine, N-phenyl-N'-octyl-p-phenylenediamine and a combination thereof.

The phenol-based anti-aging agent may be selected from the group consisting of phenol-based compounds, for example, 2,2'-methylene-bis(4-methyl-6-tert-butylphenol), 2,2'-isobutylidene-bis(4,6-dimethylphenol), 2,6-di-t-butyl-p-cresol and a combination thereof.

The quinoline-based anti-aging agent may be 2,2,4-trimethyl-1,2-dihydroquinoline or a derivative thereof, and specifically may be any one selected from the group consisting of 6-ethoxy-2,2,4-trimethyl-1,2-dihydroquinoline, 6-anilino-2,2,4-trimethyl-1,2-dihydroquinoline, 6-dodecyl-2,2,4-trimethyl-1,2-dihydroquinoline and a combination thereof.

The wax is preferably a waxy hydrocarbon.

Preferably, the anti-aging agent includes 1 to 5 parts by weight of a compound selected from the group consisting of N-(1,3-dimethylbutyl)-N-phenyl-p-phenylenediamine (6PPD), N-phenyl-n-isopropyl-p-phenylenediamine (3PPD), poly(2,2,4-trimethyl-1,2-dihydroquinoline) (RD) and a mixture thereof with respect to 100 parts by weight of the raw rubber in terms of anti-aging and rubber solubility.

The softening agent is added to the rubber composition in order to impart plasticity to rubber and thereby facilitate processing or reduce hardness of the vulcanization rubber, which means an oil which is contained in a process oil or other rubber composition. The softening agent may be any one selected from the group consisting of petroleum oil, vegetable oil and a combination thereof, but the present invention is not limited thereto.

The petroleum oil may be any one selected from the group consisting of paraffin oil, naphthene oil, aromatic oil and a combination thereof.

Representative examples of the paraffin-based oil include P-1, P-2, P-3, P-4, P-5, P-6 and the like, produced by Michang Oil Ind. Co., Ltd., representative examples of the naphthene-based oil include N-1, N-2, N-3 and the like, produced by Michang Oil Ind. Co., Ltd., and representative examples of the aromatic oil include A-2, A-3 and the like, produced by Michang Oil Ind. Co., Ltd.

However, recently, with increasing interest in environment issues, it is reported that, when 3% by weight or more of a polycyclic aromatic hydrocarbon (hereinafter referred to as "PAH") is present in the aromatic oil, a risk of inducing cancer is high. Therefore, preferred is treated distillate aromatic extract (TDAE) oil, mild extraction solvate (MES) oil, residual aromatic extract (RAE) oil or medium naphthenic oil.

In particular, the oil used as the softening agent is preferably TDAE oil which has a total PAH content of 3% by weight or less with respect to the total weight of oil, has a kinematic viscosity of 95° C. or more (210° F. SUS), and contains, in the softening agent, 15 to 25% by weight of the aromatic ingredient, 27 to 37% by weight of the naphthene-based ingredient and 38 to 58% by weight of the paraffin-based ingredient.

The TDAE oil improves low-temperature characteristics of tire treads and fuel efficiency, and offers benefits associated with environmental factors such as cancer-inducing possibility of PAHs.

The vegetable oil may be any one selected from the group consisting of castor oil, cottonseed oil, linseed oil, canola oil, soybean oil, palm oil, coconut oil, peanut oil, pine oil, pine tar, tall oil, corn oil, rice bran oil, safflower oil, sesame oil, olive oil, sunflower oil, palm kernel oil, camellia oil, jojoba oil, macadamia nut oil, safflower oil, tung oil and a combination thereof.

The softening agent is preferably used in an amount of 1 to 10 parts by weight with respect to 100 parts by weight of the raw rubber in that processability of the raw rubber can be improved.

The adhesive agent improves tackiness between rubbers and enhances miscibility, dispersibility and processability of other additives such as a filler, thereby contributing to improvement in physical properties of rubber.

The adhesive agent may be an adhesive agent based on a natural resin such as a rosin or terpene resin, or an adhesive agent based on a synthetic resin such as petroleum resin, coal tar or alkyl phenol resin.

The rosin-based resin may be any one selected from the group consisting of a rosin resin, a rosin ester resin, a hydrogenated rosin ester resin, a derivative thereof and a combination. The terpene-based resin may be any one selected from the group consisting of a terpene resin, a terpene phenol resin and a combination thereof.

The petroleum resin may be any one selected from the group consisting of an aliphatic resin, an acid-modified aliphatic resin, a cyclic resin, a hydrogenated cyclic resin, an aromatic (C9) resin, a hydrogenated aromatic resin, a C5-C9 copolymer resin, a styrene resin, a styrene copolymer resin and a combination thereof.

The coal tar may be a coumarone-indene resin.

The alkyl phenol resin may be a p-tert-alkyl phenol formaldehyde resin, and the p-tert-alkyl phenol formaldehyde resin may be any one selected from the group consisting of p-tert-butyl-phenol formaldehyde resin, p-tert-octyl-phenol formaldehyde and a combination thereof.

The adhesive agent may be present in an amount of 0.5 to 10 parts by weight, with respect to 100 parts by weight of the raw rubber. When the content of the adhesive agent is less than 0.5 parts by weight, with respect to 100 parts by weight of the raw rubber, adhesion performance is deteriorated, and when the content exceeds 10 parts by weight, physical properties of rubber may be disadvantageously deteriorated.

The rubber composition for tire treads can be produced by mixing the aforementioned ingredients by a common method. Specifically, the rubber composition can be produced by a two-step continuous process which includes a first step of thermomechanical treatment or mixing at a maximum temperature of 110 to 190° C., preferably, at a high temperature of 130 to 180° C. and is a second step of mechanical treatment typically at a low temperature less than 110° C., for example, at a temperature of 40 to 100° C. during finishing wherein a crosslinkage system is mixed, but the present invention is not limited thereto.

The rubber composition for tire treads produced by the method includes, as a reinforcing filler, with silica, a composite material that includes a granular carbon black having optimum physical properties in consideration of the effect of improving dispersability of silica, and a granular silane coupling agent, and further includes a natural oil, wherein a ratio of oleic acid (OA) to linolenic acid (LA) (OA/LA) in the unsaturated fatty acid is limited to 0.5 to 5, in order to improve, abrasion resistance, braking on ice and snowy roads and durability of the tire, so that fuel efficiency can be maintained, abrasion resistance, braking performance, lifespan and cut/chip performance can be improved, and outer appearance of tires including coloring degree can be enhanced. In addition, the rubber composition for tire treads may be incorporated in various rubber components constituting tires, without limiting to treads (tread caps and tread bases). The rubber components may include sidewalls, sidewall insertions, apexes, chafers, wire coats, inner liners and the like.

In another preferred embodiment, the present invention provides a tire manufactured using the rubber composition for tire treads.

The tire is manufactured from the rubber composition for tire treads and thus exhibits excellent fuel efficiency, improved abrasion resistance, lifespan and cut/chip performance and enhanced outer appearance.

The method for manufacturing the tire may be any method commonly used for producing tires, apart from using the afore-mentioned rubber composition for tire treads, and a detailed explanation thereof is thus omitted herein. The tire may include a tire tread manufactured using the rubber composition for tire treads.

The tire according to another embodiment of the present invention may be an automobile tire, a racing tire, an airplane tire, an agricultural machine tire, an off-the road tire, a truck tire, a bus tire or the like. In addition, the tire may be a radial tire or a bias tire, more preferably, a radial tire.

Hereinafter, the rubber composition for tire treads according to the present invention and the tire including the same will be described with reference to specific examples so that a person having ordinary knowledge in the field to which the present invention pertains can easily implement the present invention. However, the following examples of the present invention are given only for illustration of the invention and should not be construed as limiting the scope of the present invention.

Examples 1 to 5 and Comparative Examples 1 to 5

Rubber compositions of Examples and Comparative Examples 1 to 5 were mixed according to compositions and contents shown in the following Table 1 and were blended in a Banbury mixer to manufacture rubber compositions for tire treads.

TABLE 1

|  | Ex. 1 | Ex. 2 | Ex 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|
| NR[1] | 10 | 10 | 10 | 10 | 10 | 10 | 10 | 10 | 10 | 10 |
| S-SBR[2] | 55 | 55 | 55 | 55 | 55 | 55 | 55 | 55 | 55 | 55 |
| BR[3] | 35 | 35 | 35 | 35 | 35 | 35 | 35 | 35 | 35 | 35 |
| Carbon black[4] | 10 | 10 | 10 | 10 | 10 | 10 | 10 | 10 | — | — |
| Silica[5] | 90 | 90 | 90 | 90 | 90 | 90 | 90 | 90 | 100 | 100 |
| Coupling agent | 15 | 15 | 15 | 15 | 15 | 15 | 15 | 15 | 15 | 15 |
| Synthetic oil[6] | — | — | — | — | — | 20 | — | — | — | — |
| Natural oil 1[7] | — | — | — | — | — | — | 20 | — | — | — |
| Natural oil 2[8] | 20 | — | — | — | — | — | — | — | — | — |
| Natural oil 3[9] | — | 20 | — | 30 | 40 | — | — | — | — | 20 |
| Natural oil 4[10] | — | — | 20 | — | — | — | — | — | 20 | — |
| Natural oil 5[11] | — | — | — | — | — | — | — | 20 | — | — |
| Anti-aging agent | 6 | 6 | 6 | 6 | 6 | 6 | 6 | 6 | 6 | 6 |

TABLE 1-continued

|  | Ex. 1 | Ex. 2 | Ex 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|
| Vulcanization agent | 0.7 | 0.7 | 0.7 | 0.7 | 0.7 | 0.7 | 0.7 | 0.7 | 0.7 | 0.7 |
| Accelerator | 2.3 | 2.3 | 2.3 | 2.3 | 2.3 | 2.3 | 2.3 | 2.3 | 2.3 | 2.3 |

[1] Natural rubber: naturally derived rubber, chemical name: polyisoprene
[2] S-SBR: solution-polymerized styrene butadiene rubber (SBR) having a styrene content of 35%, a vinyl content of 25% in butadiene and a Tg of −35° C., including 37.5 parts by weight of a SRAE oil
[3] BR: butadiene rubber manufactured using neodymium catalyst
[4] Carbon black: carbon black having a nitrogen adsorption value of 140 $m^2/g$, and CTAB of 130 $m^2/g$
[5] Silica: highly dispersible silica having nitrogen adsorption value of 175 $m^2/g$ and CTAB of 160 $m^2/g$
[6] Synthetic oil: has a total PAH (polycyclic aromatic hydrocarbon) content of 3% by weight or less, a kinematic viscosity of 95 SUS (210° F. SUS), and includes, in the softening agent, 20% by weight of an aromatic ingredient, 30% by weight of a naphthene ingredient and 40% by weight of a paraffin ingredient
[7] Natural oil 1: a ratio of oleic acid (OA) to linolenic acid (LA) of less than 0.5
[8] Natural oil 2: a ratio of oleic acid (OA) to linolenic acid (LA) of 0.9
[9] Natural oil 3: a ratio of oleic acid (OA) to linolenic acid (LA) of 1.6
[10] Natural oil 4: a ratio of oleic acid (OA) to linolenic acid (LA) of 3
[11] Natural oil 5: a ratio of oleic acid (OA) to linolenic acid (LA) of 5

Test Example: Measurement of Physical Properties

Rubber specimens were produced using rubber compositions for tire treads produced in Examples and Comparative Examples and Moony viscosity, hardness, 300% modulus, viscoelasticity and the like of the obtained rubber specimens were measured. Results are shown in the following Table 2.

TABLE 2

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|
| Moony viscosity | 80 | 79 | 77 | 76 | 75 | 74 | 73 | 72 | 77 | 70 |
| Hardness (Shore A) | 70 | 69 | 70 | 69 | 68 | 67 | 68 | 67 | 69 | 68 |
| 300% modulus | 89 | 89 | 88 | 88 | 87 | 80 | 86 | 85 | 79 | 80 |
| Breaking energy | 552 | 560 | 582 | 589 | 593 | 598 | 601 | 603 | 585 | 562 |
| Tg (° C.) | −25 | −30 | −31 | −32 | −33 | −33 | −33 | −34 | −31 | −30 |
| −40° C. G (dyne/$cm^2$) | 2.9E+08 | 2.4E+08 | 1.9E+08 | 1.8E+08 | 1.7E+08 | 1.6E+08 | 1.4E+08 | 1.2E+08 | 2.0E+08 | 2.5E+08 |
| 0° C. tan δ | 0.212 | 0.205 | 0.204 | 0.202 | 0.200 | 0.193 | 0.201 | 0.200 | 0.190 | 0.192 |
| 60° C. tan δ | 0.127 | 0.129 | 0.129 | 0.130 | 0.130 | 0.137 | 0.132 | 0.133 | 0.127 | 0.126 |

1) Moony viscosity (ML1+4(125° C.)): measured using Mooney MV2000 (Alpha Technology) with a large rotor, under conditions of pre-heating for one minute, a rotor operation time of 4 minutes, at a temperature of 125° C. in accordance with ASTM D1646. Moony viscosity indicates the viscosity of unvulcanized rubber. As Moony viscosity increases, the viscosity of rubber increases and thus processability becomes bad, and as Moony viscosity decreases, processability becomes better.

2) Hardness: measured using a Shore A hardness meter in accordance with DIN 53505. As the hardness increases, control stability becomes excellent.

3) 300% modulus: 300% modulus is a tensile strength at elongation of 300%. It was measured in accordance with ISO 37 standard. As 300% modulus increases, strength increases.

4) Breaking energy: means an energy when rubber breaks in accordance with ISO 37 standard. It was measured by numerating an energy of strain until a specimen was broken in a tensile tester. As breaking energy increases, abrasion resistance becomes better.

5) Viscoelasticity: G', G" and tan δ were measured using an ARES meter at a frequency of 10 Hz under a strain of 0.5% from −60° C. to 70° C. Tg and −40° C. G represent braking properties on ice and snowy roads. Viscoelasticity becomes better as Tg and −40° C. decrease.

0° C. tan δ represents braking properties on dry or wet roads. As 0° C. tan δ increases, braking performance is better. 60° C. tan δ is an indicator showing rotational resistance at 60° C. As 60° C. tan δ decreases, fuel efficiency becomes better.

As can be seen from Table 2, Examples 1 to 3 including natural oils 2, 3 and 4 wherein a ratio of oleic acid to linolenic acid ranges from 0.5 to 5 are excellent in terms of processability, abrasion resistance and braking performance on ice and snowy roads, compared to Comparative Example 1 including a synthetic oil, or Comparative Example 2 wherein a ratio of oleic acid to linolenic acid is lower than 0.5.

In addition, Examples 1 to 3 are excellent in terms of abrasion resistance, braking performance on dry roads or wet roads and fuel efficiency, compared to Comparative Example 3 wherein a ratio of oleic acid to linolenic acid is higher than 5.

In addition, when comparing Examples 2, 4 and 5, as the content of natural oil increases, processability, abrasion resistance and braking performance become better.

In addition, treads are produced from the rubbers of Comparative Examples and Examples, 215/60R16V tires including tread rubbers as half-finished products are manufactured, and fuel efficiency relating to rotational resistance on roads, braking distance, performance on ice and snowy roads, and relative proportions obtained by vehicle real abrasion testing are shown in Table 3.

When the relative proportion has a dynamic range of 5% or more, impacts on improvement and reduction are great. That is, when the relative proportion is less than 95% or less, it is inapplicable due to insufficient performance, and when the relative proportion is 105 or more, the effect of improving performance is considerably low.

TABLE 3

| | Ex. 1 | Ex. 2 | Ex. 3 | Ex. 4 | Ex. 5 | Comp. Ex. 1 | Comp. Ex. 2 | Comp. Ex.3 | Comp. Ex. 4 | Comp. Ex. 5 |
|---|---|---|---|---|---|---|---|---|---|---|
| Rotation resistance | 98 | 98 | 97 | 96 | 96 | 100 | 99 | 91 | 98 | 98 |
| Braking performance on wet roads | 98 | 98 | 98 | 97 | 96 | 100 | 98 | 89 | 95 | 95 |
| Braking performance on wet roads | 105 | 107 | 108 | 112 | 114 | 100 | 102 | 112 | 107 | 106 |
| Abrasion resistance | 109 | 113 | 115 | 121 | 124 | 100 | 102 | 120 | 110 | 108 |

As can be seen from the table above, Examples using a natural oil instead of a conventional synthetic oil improve miscibility of rubber, thereby significantly improving braking performance on ice and snowy roads, and abrasion resistance while minimizing deterioration in rotational resistance and braking performance on wet roads.

When the specific ratio (a ratio of oleic acid to linolenic acid) of natural oil is lower than 0.5, trade-off of braking performance on wet roads is great and rotation resistance, when the ratio is higher than 5 more, trade-off is low, but braking performance on ice and snowy roads and abrasion resistance are also low. In addition, these effects tend to improve as the amount increases within suitable parts by weight.

Tires which exhibit excellent abrasion resistance, braking performance, and tread durability can be manufactured by using the rubber composition for tire treads according to the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A rubber composition for tire treads comprising:
    100 parts by weight of a raw rubber;
    70 to 120 parts by weight of a reinforcing filler; and
    20 to 40 parts by weight of a natural oil,
    wherein the natural oil has a ratio of linolenic acid:oleic acid of 1:0.9 to 1:3,
    wherein the natural oil comprises 60 to 90% by weight of unsaturated fatty acid,
    wherein the natural oil comprises an oil substance obtained by extracting and separating the linolenic acid and the oleic acid from any one natural oil selected from the group consisting of soybean oil, sunflower seed oil, cottonseed oil, corn oil, canola oil, palm oil, grape seed oil and a mixture thereof, and then mixing the same,
    wherein the raw rubber comprises:
        5 to 10 parts by weight of a natural rubber;
        40 to 70 parts by weight of a solution-polymerized styrene butadiene rubber; and
        20 to 50 parts by weight of a neodymium butadiene rubber,
    wherein the solution-polymerized styrene butadiene rubber has a styrene content of 20 to 50% by weight, a vinyl content of 10 to 40% by weight, a Tg of −50 to −20° C., and comprises 20 to 40 parts by weight of an SRAE oil,
    wherein the neodymium butadiene rubber has a cis-1,4-butadiene content of 95% by weight or more and a Tg of −100 to −120° C., and
    wherein the reinforcing filler comprises:
        65 to 100 parts by weight of a highly dispersible silica; and
        5 to 20 parts by weight of carbon black.

2. The rubber composition according to claim 1, wherein the highly dispersible silica has a nitrogen adsorption value of 160 to 180 $m^2$/g, a CTAB adsorption value of 150 to 170 $m^2$/g, and a DBP absorption amount of 180 to 200 cc/100 g.

3. The rubber composition according to claim 1, wherein the rubber composition for tire treads further comprises 5 to 20 parts by weight of a silane coupling agent selected from the group consisting of bis-(trialkoxysilylpropyl)polysulfide (TESPD), bis-3-triethoxysilylpropyltetrasulfide (TESPT) and a mixture thereof, with respect to 100 parts by weight of the raw rubber.

4. A tire manufactured using the rubber composition for tire treads according to claim 1.

* * * * *